US007496054B2

(12) United States Patent
Taylor

(10) Patent No.: US 7,496,054 B2
(45) Date of Patent: Feb. 24, 2009

(54) NETWORKED COMPUTER TELEPHONY SYSTEM DRIVEN BY WEB-BASED APPLICATIONS

(75) Inventor: Jonathan R. Taylor, Aptos, CA (US)

(73) Assignee: Voxeo Corporation, Orlando, FL (US)

( * ) Notice: Subject to any disclaimer, the term of this patent is extended or adjusted under 35 U.S.C. 154(b) by 618 days.

(21) Appl. No.: 11/169,821

(22) Filed: Jun. 28, 2005

(65) Prior Publication Data

US 2005/0240659 A1  Oct. 27, 2005

Related U.S. Application Data

(62) Division of application No. 09/675,497, filed on Sep. 29, 2000, now Pat. No. 6,922,411.

(51) Int. Cl.
*H04L 12/28* (2006.01)

(52) U.S. Cl. ..................................... 370/255

(58) Field of Classification Search ................ 370/255, 370/401, 352–359; 704/275; 709/239–244
See application file for complete search history.

(56) References Cited

U.S. PATENT DOCUMENTS

| | | | |
|---|---|---|---|
| 5,968,121 A * | 10/1999 | Logan et al. ................. | 709/219 |
| 6,154,738 A | 11/2000 | Call | |
| 6,314,425 B1 | 11/2001 | Serbinis et al. | |
| 6,430,624 B1 | 8/2002 | Jamtgaard et al. | |
| 6,477,522 B1 * | 11/2002 | Young ............................ | 707/2 |
| 6,490,564 B1 * | 12/2002 | Dodrill et al. ................ | 704/275 |
| 6,578,000 B1 | 6/2003 | Dodrill et al. | |

(Continued)

FOREIGN PATENT DOCUMENTS

WO    WO 98/37688    8/1998

OTHER PUBLICATIONS

"Notification of Transmittal of the International Search Report or the Declaration", corresponding PCT application No. PCT/US01/30342, International Searching Authority, European Patent Office, Dec. 27, 2002, 8 pages.

(Continued)

*Primary Examiner*—Dmitry Levitan
(74) *Attorney, Agent, or Firm*—Davis Wright Tremaine LLP

(57) ABSTRACT

A networked telephony system and method allow users to deploy on the Internet computer telephony applications associated with designated telephone numbers. The telephony application is easily created by a user in XML (Extensible Markup Language) with predefined telephony XML tags and easily deployed on a website. The telephony XML tags include those for call control and media manipulation. A call to anyone of these designated telephone numbers may originate from anyone of the networked telephone system such as the PSTN (Public Switched Telephone System), a wireless network, or the Internet. The call is received by an application gateway center (AGC) installed on the Internet. Analogous to a web browser, the AGC provides facility for retrieving the associated XML application from its website and processing the call accordingly. The architecture and design of the system allow for reliability, high quality-of-service, easy scalability and the ability to incorporate additional telephony hardware and software and protocols.

5 Claims, 11 Drawing Sheets

U.S. PATENT DOCUMENTS

| | | | |
|---|---|---|---|
| 6,584,110 B1 * | 6/2003 | Mizuta et al. | 370/401 |
| 6,854,120 B1 | 2/2005 | Lo et al. | |
| 6,920,498 B1 * | 7/2005 | Gourlay et al. | 709/227 |
| 6,973,617 B1 * | 12/2005 | Parasu | 715/234 |
| 2002/0006124 A1 | 1/2002 | Jimenez et al. | |
| 2003/0007621 A1 | 1/2003 | Graves et al. | |
| 2003/0142625 A1 | 7/2003 | Wan et al. | |

OTHER PUBLICATIONS

Atkins et al., "XP 000659566 Integrated Web and Telephone Service Creation", Bells Labs Technical Journal, Winter 1997, pp. 19-35.

Rosenberg et al., "XP-000870630 Programming Internet Telephony Services", IEEE Network, May/Jun. 1999, pp. 42-49.

VoiceXML Forum, Voice Extensible Markup Language, Voice XML, Aug. 1999, pp. 1-64.

* cited by examiner

PROVISIONING

130 — For a given dialed number (DN), create an associated application vAPP(DN) in XML, and post the resulting webpage on the Internet 132 — Provide any media, files, web applications that will be requested or act on by vAPP(DN)

134 — Enter the address of vAPP(DN) in a directory DIR1

Call(DN)

CALL PROCESSING

140 — A new call to (DN) is routed to vAGC

142 — vAGC looks up URL for the address of vAPP(DN) (e.g. uses DN to query DIR1 for the address of the associated vAPP)

144 — vAGC retrieves the XML scripts of the vAPP(DN)

146 — vAGC processes the new call by executing the retrieved XML scripts

*FIG. 3*

NETWORKED COMPUTER TELEPHONY SYSTEM DRIVEN BY WEB-BASED APPLICATIONS

CROSS-REFERENCE TO RELATED APPLICATION

This application is a divisional of application Ser. No. 09/675,497, filed Sep. 29, 2000, which application is incorporated herein in its entirety by this reference.

FIELD OF THE INVENTION

The present invention relates to telecommunication, and more particularly to a networked computer telephony system including the Internet and the Public Switched Telephone System and driven by XML-based telephony applications distributed on the Internet.

BACKGROUND OF THE INVENTION

Two major telecommunication networks have evolved worldwide. The first is a network of telephone systems in the form of the Public Switched Telephone System (PSTN). This network was initially designed to carry voice communication, but later also adapted to transport data. The second is a network of computer systems in the form of the Internet. The Internet has been designed to carry data but also increasingly being used to transport voice and multimedia information. Computers implementing telephony applications have been integrated into both of these telecommunication networks to provide enhanced communication services. For example on the PSTN, computer telephony integration has provided more functions and control to the POTS (Plain Old Telephone Services). On the Internet, computers are themselves terminal equipment for voice communication as well as serving as intelligent routers and controllers for a host of terminal equipment.

FIG. 1A illustrates a typical configuration of a conventional computer telephony server operating with a Public Switched Telephone Network (PSTN) and/or the Internet. Telephone service is traditionally carried by the PSTN. The PSTN 10 includes a network of interconnected local exchanges or switches 12. Around each exchange is provisioned a cluster of telephone lines to which telephones, modems, and facsimile machines may be attached. Other private exchanges such as Private Brach Exchange (PBX) 20 may also be connected to the PSTN to form a public/private telephone network. Voice or data is carried from a source node to a destination node on the network by establishing a circuit path along the PSTN effected by appropriately switching the interconnecting exchanges. The point-to-point transmission is therefore circuit-switched, synchronous and using a dedicated channel of fixed bandwidth (64 kbs). With the introduction of digital networks, the exchanges have mostly been upgraded to handle digital, time-division multiplexed trunk traffic between the exchanges. External digital communication systems typically communicate with the PSTN by interfacing with an exchange such as 12. A common digital interface at the exchange is PRI (Primary Rate Interface), which is part of an ISDN (Integrated Services Digital Network) and is usually provided by a T1 or E1 trunk line. Depending on the bandwidth requirement of the external system, the interface with an exchange may require from one to a multiple of PRI connections.

The Internet 30 is a worldwide interconnection of IP (Internet Protocol) networks, with interconnecting computers communicating with each other using TCP/IP (Transmission Control Protocol/Internet Protocol). Some of the computers may also be interconnected by a private segment of the IP network with restricted access. On an IP network, data from a source node is cast into a number of packets that may individually be transported via multiple paths on the network to be reassembled at a destination node. The transmission on the IP network is packet-switched and asynchronous.

On an IP network, voice or multimedia information can also be digitized as data and transported over the network using the Internet Protocol (IP). In that case, it is generally referred to as VoIP or (Voice-over-IP). The H.323 standard promulgated by the ITU (International Telecommunication Union) aims to ensure VoIP interoperability. It provides a specification for communication of multimedia such as voice, data and video between terminal equipment over IP networks. The terminal equipment communicating on the Internet includes personal computers with telephony capabilities 40, VoIP phones 42 that can connect to the Internet directly, and other networked telephony appliances.

In recent years, the World Wide Web (WWW) has become a universal platform for information dissemination on the Internet. Web applications 44 in general and web pages in particular are written in HTML (HyperText Markup Language) and are hosted by web servers 46 on the Internet. Each web page can be called up by its URL (Uniform Resource Locator), which is its IP address on the Internet. These web pages may be requested and processed by a web browser running on a computer connected to the Internet. The web browser retrieves the web page under HTTP (HyperText Transfer Protocol) and parses the HTML codes on the web page to execute it. Typically, the execution of HTML codes on a web page results in rendering it into a display page on the browser or client computer. In other instances, it may result in the execution of some backend functions on the client and/or server computers. One reason for the widespread acceptance of the WWW is the relative ease with which web applications can be created and deployed, and the existence of standardized web browsers. HTML, with its tag-coding scheme, is now well known to everyone from the professional developer to the savvy end user. More recently, XML (Extensible Markup Language) has been introduced to extend HTML with enhanced features including customizable tags that allow for more structural specification of data.

Telephony or Computer Telephony Integration (CTI) involves using a computer to control and manage a phone or a telephone system. When applied to a phone or a terminal equipment, CTI provides added features to an end user's phone. When applied to a telephone system whether as part of the PSTN or part of an IP telephony network system, CTI is usually implemented with a CT (Computer Telephony) server, such as CT server 50. Such a server executes telephony applications that can provide custom services such as interactive voice response, customer service or help desk for an organization. The CT server 50 can be configured to interface via a PSTN interface 52 with an exchange 12 to receive and process calls pertaining to a predefined set of telephone numbers on the PSTN. Similarly, it can also be configured to interface via an IP network interface 54 with the Internet to receive and process calls pertaining to a predefined set of telephone numbers or IP addresses. The CT server 50 is usually a computer operating under UNIX or Microsoft Windows NT and is running installed customized application software 56 for the various voice applications. The CT server provides a set of APIs 58 (Application Program Interfaces) which are procedures, protocols and tools for building software applications. These APIs are generally proprietary and specific to the individual hardware manufacturers. Developing an application on an existing CT server would involve a highly specialized application developer undertaking a fairly complex task of coding the application in C++ or JAVA programming language and employing and invoking the APIs specific to the hardware.

U.S. Pat. No. 6,011,844 discloses a distributed call center system in which a business call center running a custom interactive voice response application is essentially replicated in a number of local points of presence to reduce communication cost when connecting a local customer.

FIG. 1B illustrates a Point-Of-Presence call center management system disclosed in U.S. Pat. No. 6,011,844. The system is designed to minimize long distance toll call when a customer 70 is calling a business call center 60. The business call center typically runs a customized interactive voice response application 66 that implements a complete business solution to answer, service, queue and route inbound customer calls. The customer 70 at a local exchange 72 will in general be calling long distance to the business call center 60 that is local to a remote exchange 74. When the customer requests to speak to a live agent 68 at the business call center, his or her call is queued until an agent is available. Thus, during the long distance call, apart from interacting with the interactive voice responses, a substantial portion of time could be incurred while waiting to speak to an agent. To reduce the long distance connection time, the POP call center management system deploys a number of POP call centers 80 across the Public Switched Telephone Network (PSTN) 10 so that a customer's call at a local exchange 72 is intercepted at a local POP call center 80. Each POP call center essentially serves as a local-presence business call center except without the live agent. This is accomplished by having each POP call center executing the application such as 66', 66" locally. The local applications 66', 66" can be full replicas of the application 66 residing at the business call center or they can be partial ones with some of the resources such as voice prompts, menus, etc., being accessed dynamically from the application 66 as needed. The application 66 that resides at the business call center is accessible by the POP call centers via an interconnecting virtual private network 90. Optionally, HTML or XML may be used when the POP call center accesses conveniently packaged units of information or applications from the business call center across the call center virtual private network 90. Thus, with the exception of speaking to a live agent, the customer's call is basically handled at a POP call center local to the customer. When the customer requests to speak to a live agent, a queue is set up at the business call center until an agent becomes available. Only then will the POP call center convert the customer's local call to a long distance call to the business call center. The voice traffic for the interactive voice response portion is carried between the local exchange 72 and a POP call center 80. The voice traffic between the customer 70 and a live agent 68 is carried via a long distance portion 76 of PSTN, or in other disclosed embodiments, over the call center virtual private network 90 or the Internet 30.

Prior computer telephony systems have infrastructures that do not allow easy development and deployment of telephony applications. The system illustrated in FIG. 1A requires the telephony application to be hosted in a call center type of telephony server and requires specialized knowledge of the telephony hardware to develop telephony applications. The same is true for the system illustrated in FIG. 1B with the variation that the call center is effectively replicated at various local points of presence on the global telephone network.

SUMMARY AND OBJECTS OF THE INVENTION

It is therefore a general object of the invention to provide a computer telephony system that allows easy development and deployment of telephony applications.

It is another general object of the invention to provide an infrastructure in which a large number of developers and end users can easily create and deploy custom telephony applications for controlling and managing telephone calls on the PSTN and the Internet.

It is another object of the invention to have a computer telephony system that provides an application development and deployment environment similar to that for HTML applications and the World Wide Web.

It is another object of the invention to provide a low cost routing of telephone calls among the interconnected PSTN and Internet.

It is yet another object of the invention to provide a telecommunication network with improved quality of service.

These and other objects of the invention are accomplished, briefly, by providing a networked computer telephony system that includes creating telephony applications in XML scripts that include telephony-specific XML tags specifying how a telephone call to a specified call number is to be processed. The XML scripts associated with each specific call number are posted on web servers on the Internet. A telephone call to the specified call number is routed through the Internet to an application gateway center. The application gateway center retrieves the associated XML scripts and executing the scripts to process the call.

In a preferred embodiment, a plurality of application gateway centers are installed on the Internet to provide for reliability, scalability and high quality of service.

In a preferred embodiment, the application gateway center includes a cache server for caching data exchanged between the application center and the Internet.

In a preferred embodiment, the application gateway center manipulates media in a predefined native format; and the application gateway center includes a media conversion proxy server for converting between said predefined format native to the application gateway center and other media formats outside of the application gateway center.

According to another aspect of the invention, a method of processing a telephone call to a specified call number includes providing an Extensible Markup Language (XML) document associated with the specified call number, said XML document constituting a telephony application and including telephony-specific XML tags instructing how a telephone call to the specified call number is to be processed; posting said XML document to a specified location on the Internet; providing a directory for locating said XML document by the specified call number; receiving said telephone call on the Internet; retrieving said XML document at the specified location looked up from said directory with the specified call number; and processing said telephone call according to said XML document.

According to another aspect of the invention, in order to provide high quality of service, the networked computer telephony system further includes a plurality of network traffic monitors. Each monitor is associated with an individual application gateway center for periodically monitoring network traffic statistics regarding a response time of a specific XML document being requested by a specific application gateway center. A network monitoring server dynamically analyzes said network statistics collected from said plurality of network traffic monitors into a prioritized list of XML documents relative to application gateway centers having the fastest access thereto. The prioritized list is used for directing a telephone call to a specific call number to the application gateway with the fastest access to the XML document associated with the specific call number.

Additional objects, features and advantages of the present invention will be understood from the following description of its preferred embodiments, which description should be taken in conjunction with the accompanying drawings.

BRIEF DESCRIPTION OF THE DRAWINGS

FIG. 3 is a flow diagram illustrating the setup for provisioning and processing voice applications according to a general embodiment of the present invention.

DESCRIPTION OF THE PREFERRED EMBODIMENTS

As mentioned in an earlier section, the Internet is a worldwide network of IP networks communicating under TCP/IP. Specifically, voice and other multimedia information are transported on the Internet under the VoIP (Voice-over-IP) protocol, and particularly under the H.323 standard that has been put forward for interoperability.

Figure 1A:
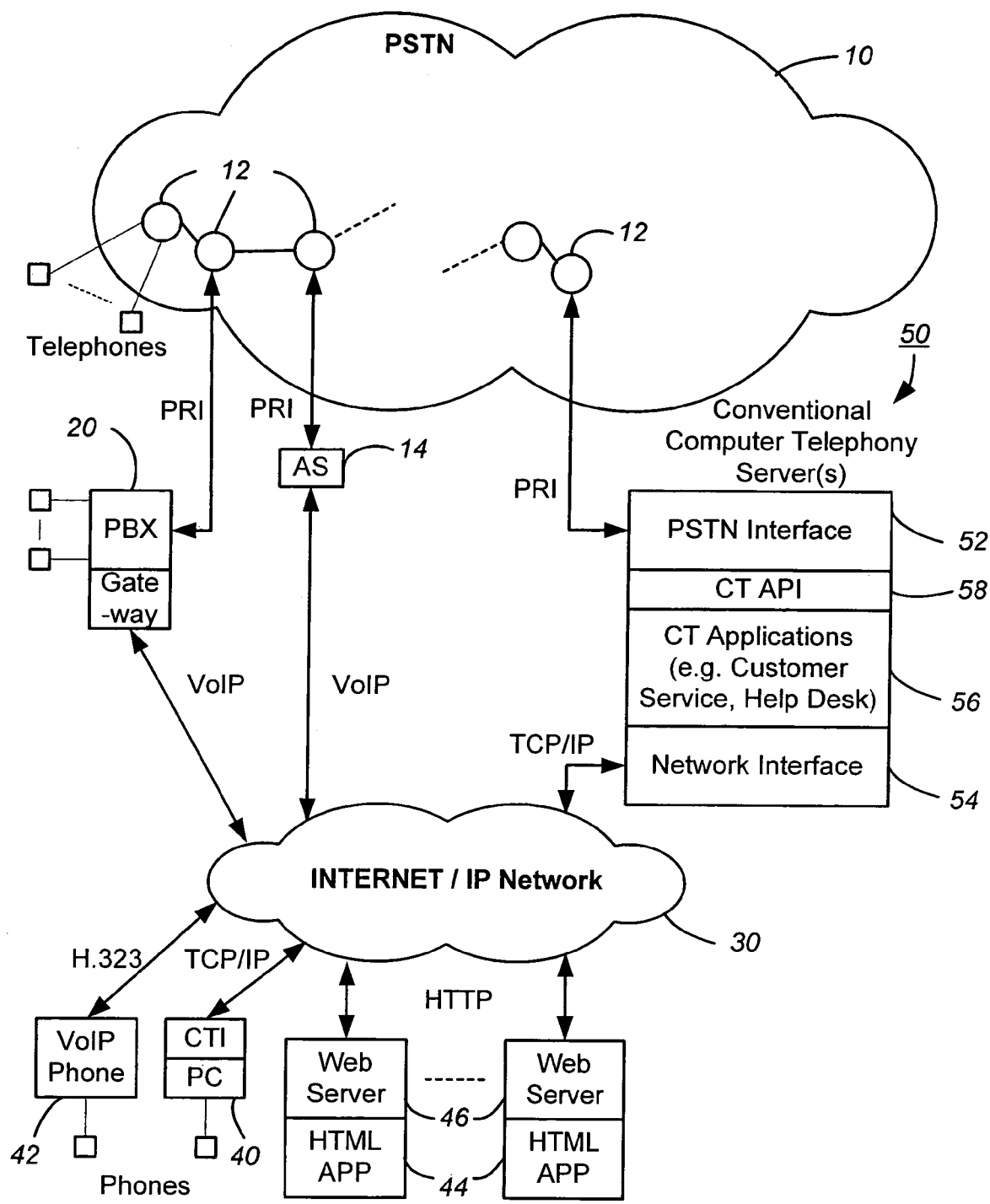
FIG. 1A illustrates a typical configuration of a conventional computer telephony server operating with a Public Switched Telephone Network (PSTN) and/or the Internet.
Figure 1B:
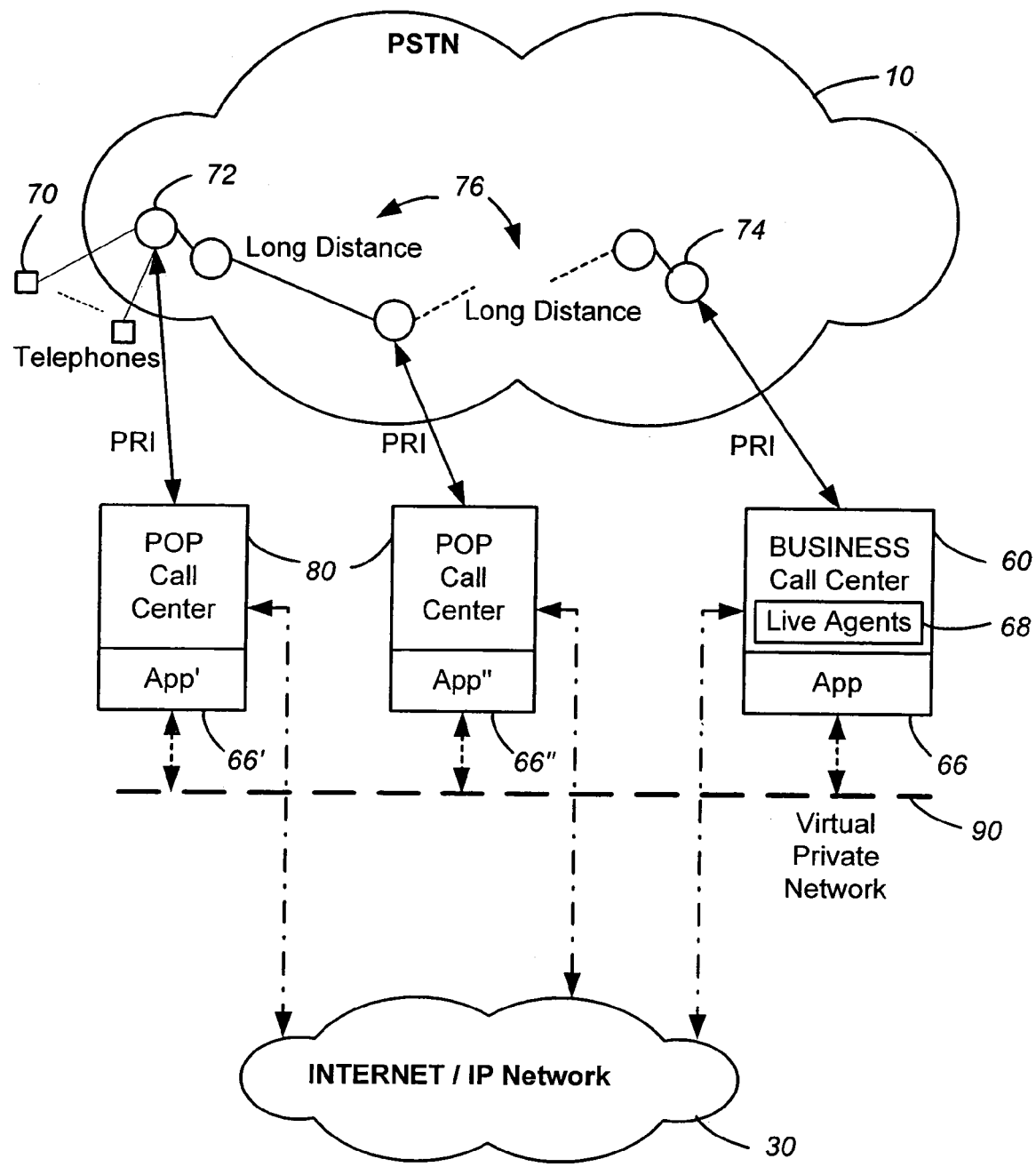
FIG. 1B illustrates a Point-Of-Presence call center management system disclosed in U.S. Pat. No. 6,011,844.
Figure 2:
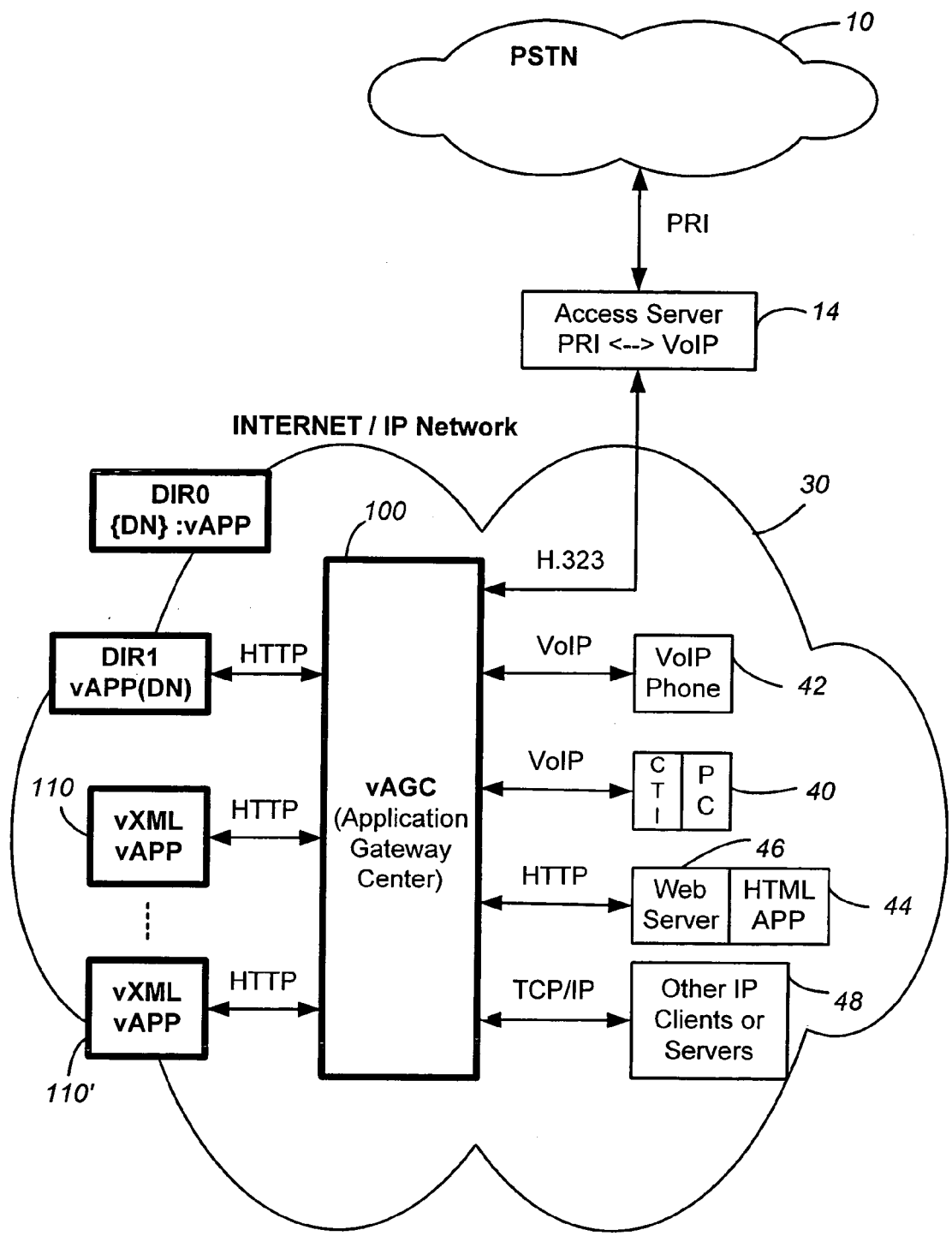
FIG. 2 illustrates an Application Gateway Center (vAGC) for processing telephony applications on the Internet and the PSTN, according to a general scheme of the present invention.

FIG. 2 shows a typical environment including the Internet and the PSTN in which the present invention is practiced. The Internet 30 acts as a VoIP network for communication between terminal equipments, such as personal computers (PC) 40 with telephony capabilities and/or dedicated VoIP phones 42 connectable directly to the Internet. Each terminal equipment on the Internet has an IP address that may also be associated with a predefined call number so that one terminal equipment may call another one by its IP address or equivalently by its call number. Also deployed on the Internet are HTML applications such as an application 44 hosted on a web server 46 that may also interact with other clients and servers 48 on the Internet.

On the other hand, the PSTN 10 is a network of exchanges. Each exchange is provisioned with a plurality of telephone lines or nodes having designated call numbers. Two PSTN nodes are connectable by switching the intervening exchanges to form a circuit.

The PSTN and the Internet are interconnected by means of access servers such as an access server 14. This enables communication between a PSTN node and an Internet node. A telephonic call transported between two network nodes comprises a signaling portion for setting up and tearing down the call and a media portion for carrying the voice or multimedia data. The access server 14 essentially converts both of these portions to an appropriate format across the interface between the two types of networks. On the PSTN side the digital interface is PRI and on the Internet side the interface is VoIP. A wireless or mobile telephone network (not shown) may similarly be considered as an extension of the PSTN. It is typically connected to the PSTN via a suitable interface implemented by a gateway.

FIG. 2 illustrates an Application Gateway Center (vAGC) for processing telephony applications on the Internet and the PSTN, according to a general scheme of the present invention. The Application Gateway Center (vAGC) 100 is a call-processing center on the Internet 30 for intercepting and processing calls to any one of a set of designated telephone call numbers. The calls may originate or terminate on any number of interconnected telecommunication networks including the Internet 30, the PSTN 10, and others (not shown) such as wireless networks. The vAGC 100 processes each call according to the telephony application (vAPP) associated with the called number. A plurality of these associated telephony application, vAPPs, such as 110, . . . , 110', are deployed on the Internet in the form of XML applications. These XML applications, denoted more specifically as (vXML) applications, are coded in XML scripts that also contain custom telephony XML tags. The vXML scripts allow complete telephony applications to be coded.

The set of designated call numbers handled by the vAGC 100 are registered in a directory, such as DIR0. When a call to one of the designated call numbers is made from the PSTN, it is switched to the access server 12 and a lookup of the directory DIR0 allows the call to be routed to vAGC 100 for processing. Similarly, if the call originates from one of the terminal equipment on the Internet, a directory lookup of DIR0 provides the pointer for routing the call to the vAGC 100.

The plurality of telephony applications vAPP 110, . . . , 110', each associated with at least one designated call number is accessible by the vAGC from the Internet. Each application is coded in vXML and is being hosted as a webpage on a web server on the Internet. A directory DIR1 provides the network address of the various applications. When the vAGC 100 received a call, it uses the call number (or dialed number DN) to look up DIR1 for the IP address of the vAPP associated with the DN. The vAGC 100 retrieves the vXML webpage and executes the call according to the vXML scripts.

FIG. 3 is a flow diagram illustrating the setup for provisioning and processing voice applications according to a general embodiment of the present invention. Provisioning of a designated call number with its associated vAPP is described in steps 130, 132 and 134.

Step 130: For a given call number DN, create an associated telephony application, vAPP in vXML, and deploy it on the Internet with a specific IP address or URL.

Step 132: Provide any media, files and web applications that are requested or act on by vAPP.

Step 134: Update the directory DIR1 so that the address of vAPP can be obtained by querying with its associated call number DN.

Call processing by vAGC 100 is described in steps 140, 142, 144 and 146.

Step 140: vAGC receives a call with DN routed thereto.

Step 142: vAGC uses DN to look up DIR1 for the address of the webpage for vAPP.

Step 144: vAGC requests and retrieves the webpage containing vXML scripts for vAPP.

Step 146: vAGC processes the call according to the retrieved vXML scripts for vAPP.

Figure 4A:
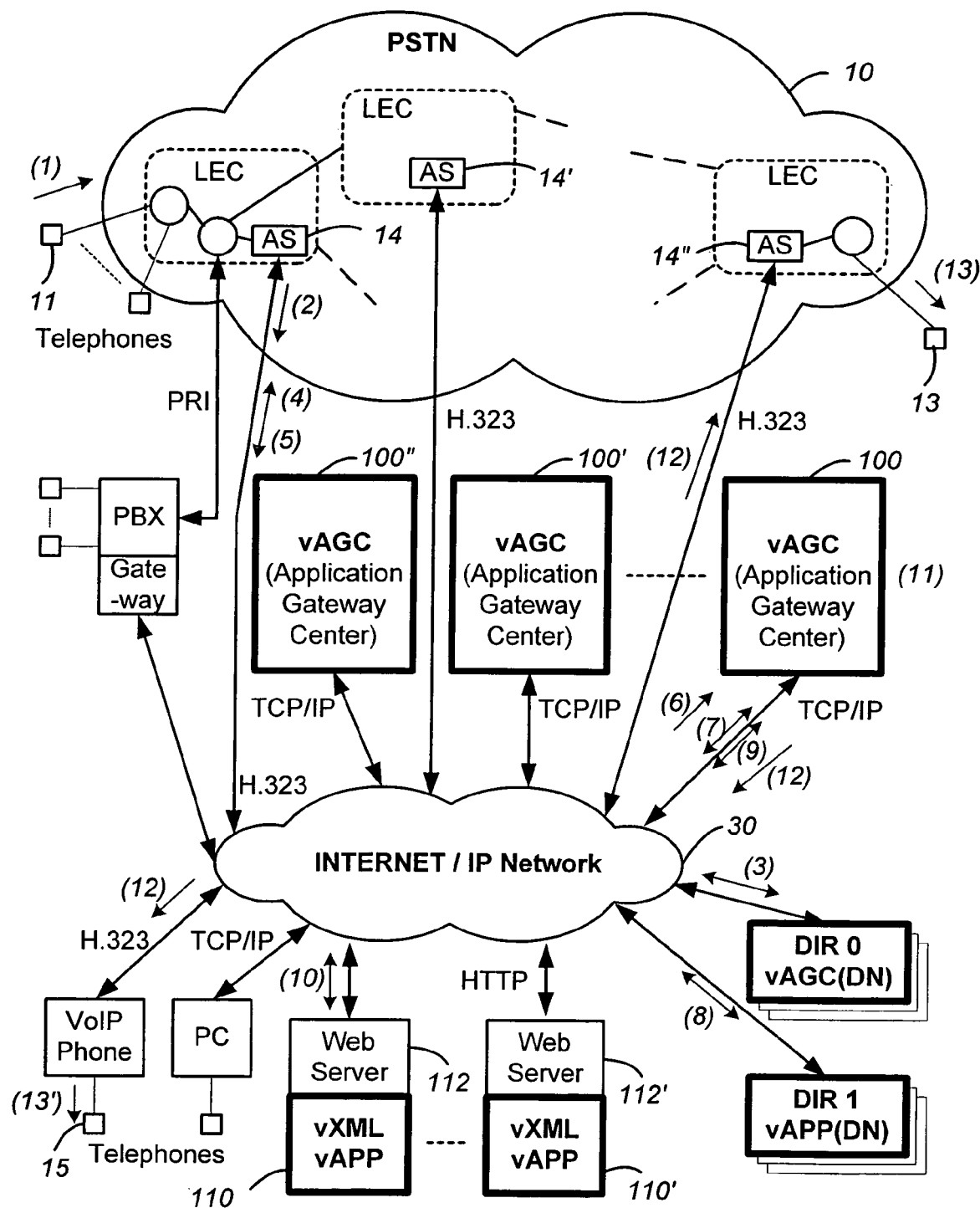
FIG. 4A illustrates a preferred configuration of the inventive system with respect to the Internet and the PSTN.

FIG. 4A illustrates a preferred configuration of the inventive system with respect to the Internet and the PSTN. The configuration is similar to that shown in FIG. 2 except there are a plurality of Application Gateway Centers (vAGCs) 100, 100', . . . , 100" deployed on the Internet 30. This will provide redundancy, capacity and load-balancing for executing the plurality of telephony applications vAPP 110, . . . , 110" being hosted by webservers 112, . . . , 112' on the Internet. In order to provide local access to the Internet 30 from anywhere on the PSTN 10, individual Local Exchange Carriers (LECs) covering the PSTN are provided with an access server (AS). Each access server communicates on the one hand with an exchange of the LEC via the PRI interface and on the other hand with the Internet via the H.323 VoIP standard. In this way, a call made at most nodes on the PSTN can be routed to the Internet without incurring a toll call outside an LEC domain.

Figure 4B:
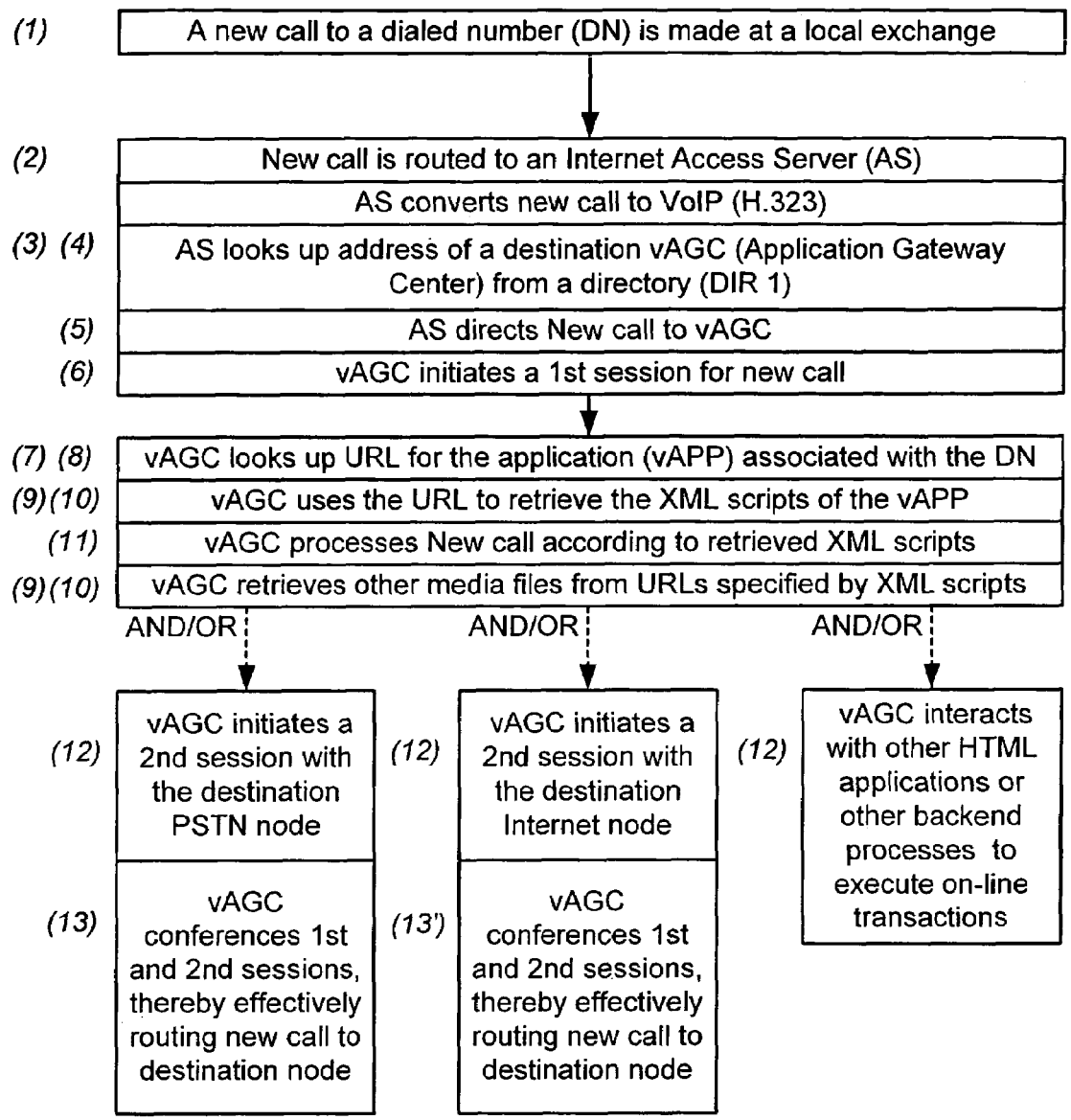
FIG. 4B is a flow diagram illustrating an exemplary call routing and processing in the preferred configuration shown in FIG. 4A.

FIG. 4B is a flow diagram illustrating an exemplary call routing and processing in the preferred configuration shown in FIG. 4A. The numeral in parenthesis denotes the route taken. A new call originates from a telephone line 11 on a local exchange. Since the call is made to a dialed number (DN) registered as one of the numbers handled by the vAGC, it is routed to a vAGC such as vAGC 100 after a lookup from DIR0. The vAGC 100 initiates a new session for the call and looks up DIR1 for the net address of the telephony application vAPP 110 associated with the DN. The vAGC 100 retrieves vAPP 110 and proceeds to process the vXML scripts of vAPP 110. In one example, the vXML scripts dictate that the new call is to be effectively routed back to the PSTN to a telephone 13 on another local exchange. In another example, the vXML scripts dictate that the call is to be effectively routed to a VoIP phone 15 on the Internet. In practice, when connecting between two nodes, the vAGC creates separate sessions for the two nodes and then bridges or conferences them together. This general scheme allows conferencing between multiple parties. In yet another example, the vXML scripts allows the call to interact with other HTML applications or other backend databases to perform on-line transactions.

Thus, the present system allows very powerful yet simple telephony applications to be built and deployed on the Internet. The following are some examples of the vAPP telephony applications contemplated. A "follow-me-find-me" application sequentially calls a series of telephone numbers as specified by a user until one of the numbers answers and then connects the call. Otherwise, it does something else such as takes a message or sends e-mail or sends the call to a call center, etc. In another example, a Telephonic Polling application looks up from a database the telephone numbers of a population to be polled. It then calls the numbers in parallel, limited only by the maximum number of concurrent sessions supported, and plays a series of interactive voice prompts/messages in response to the called party's responses and records the result in a database, etc. In another example, a Help Desk application plays a series of interactive voice prompts/messages in response to the called party's responses and possibly connects the call to a live agent as one option, etc. In yet another example, a Stock or Bank Transactions application plays a series of interactive voice prompts/messages in response to the called party's responses and conducts appropriate transactions with a backend database or web application, etc.

Figure 5:
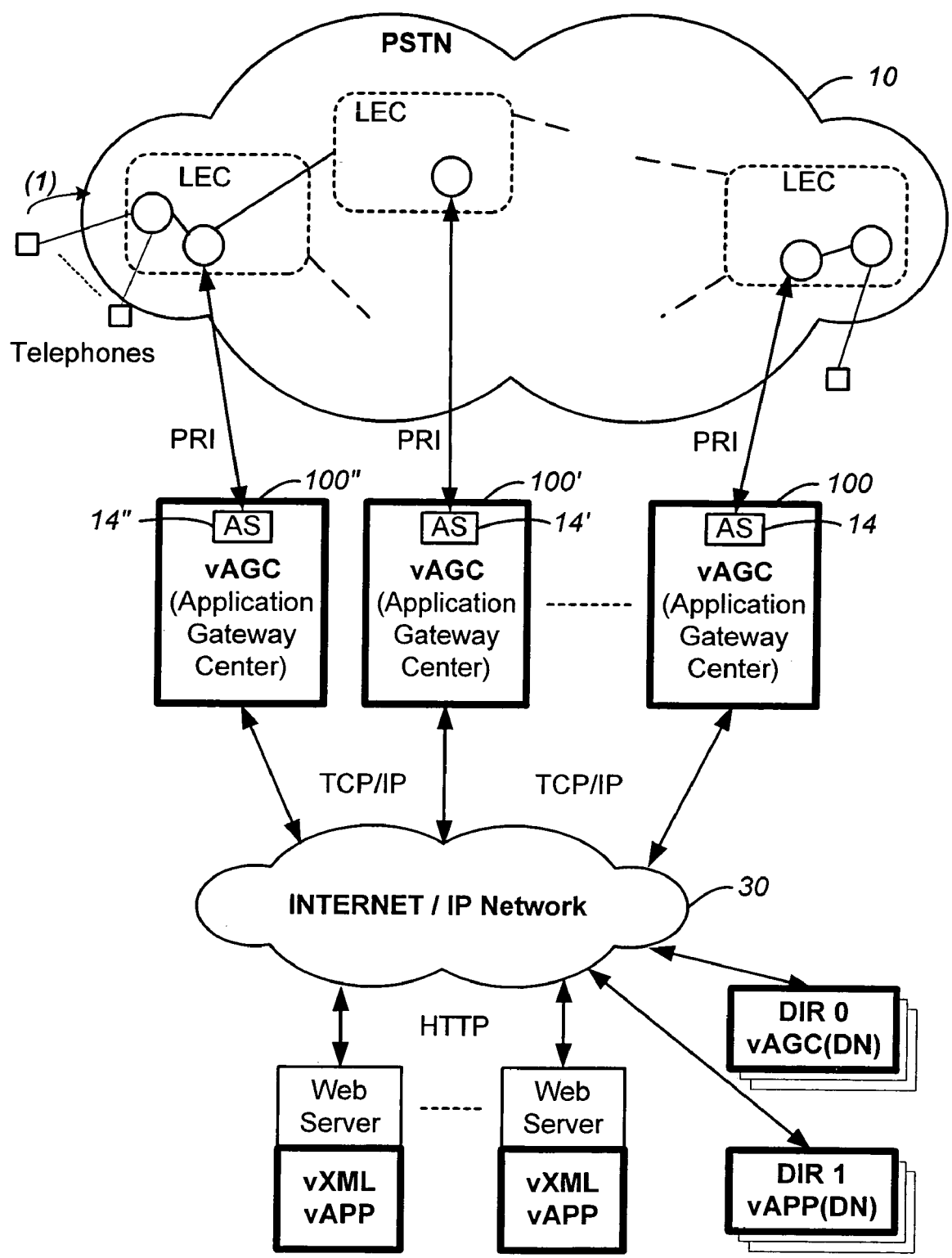
FIG. 5 illustrates an alternative preferred configuration of the inventive system with respect to the Internet and the PSTN.

FIG. 5 illustrates an alternative preferred configuration of the inventive system with respect to the Internet 30 and the PSTN 10. The arrangement is similar to that of FIG. 4A except at individual LECs, the Application Gateway Centers vAGC 100, 100', . . . , 100" are respectively co-located with the local access servers AS 14", 14', . . . , 14. This configuration provides higher quality-of-service (QoS) at the expense of repeating the vAGC at every LEC.

Figure 6:
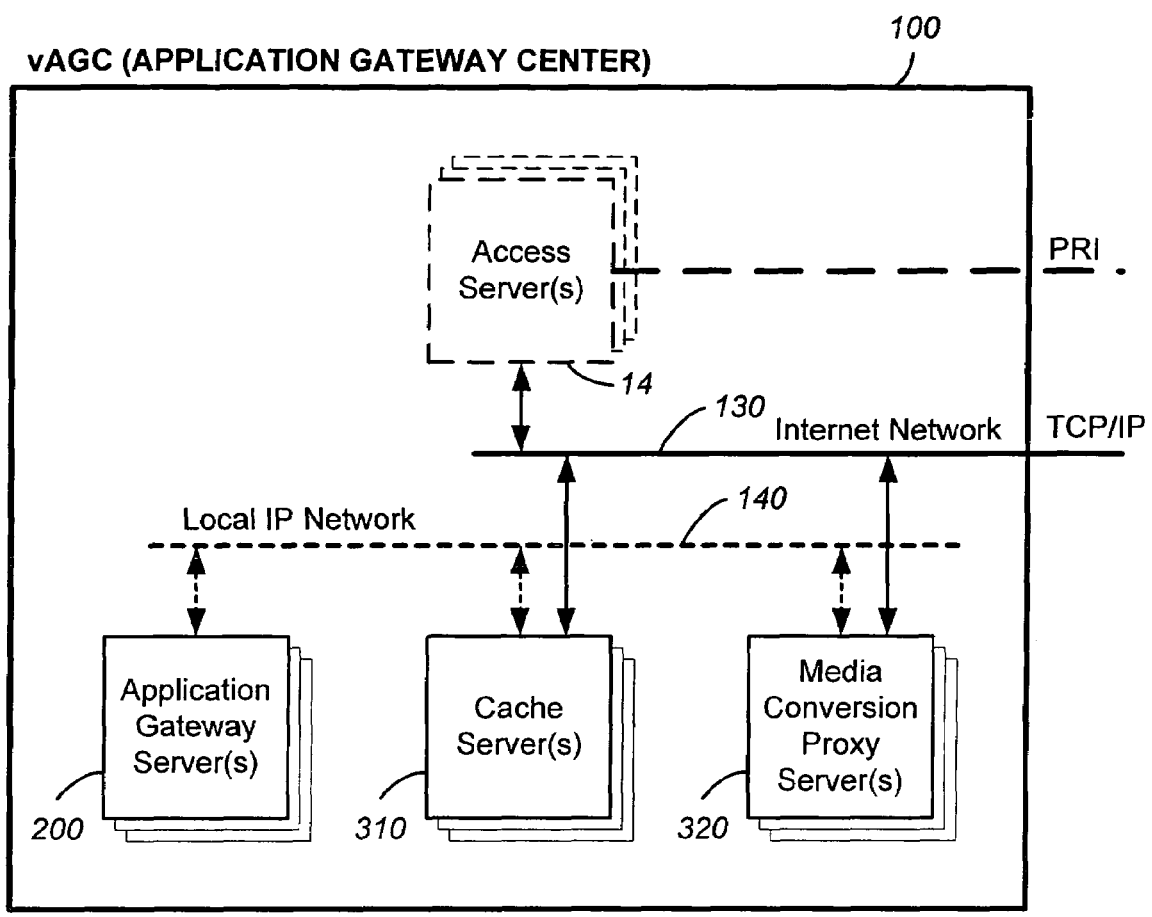
FIG. 6 is a block diagram illustrating the components of the Application Gateway Center.

FIG. 6 is a block diagram illustrating the components of the Application Gateway Center. The Application Gateway Center vAGC 100 may be considered to be a facility hosting a cluster of servers for the purpose of receiving calls and running the associated telephony applications, vAPPs, reliably and efficiently. In the preferred embodiment, the vAGC 100 comprises two IP network segments. An Internet network segment 130 connects the vAGC 100 to the Internet. A local IP network segment 140 allows direct communication between an application gateway server 200, a cache server 310 and a media conversion proxy server 320. The cache server 310 and the media conversion proxy server 320 are also connected directly to the Internet via the Internet network segment 130. To increase performance and reliability, multiple servers of each type are installed in the vAGC 100.

The application gateway server 200 exchanges data with the Internet indirectly through the cache server 310 and possibly the media conversion proxy server 320. As will be described in more detail later, upon receiving a call, the AGS 200 retrieves the associated vAPP from a website and proceeds to execute the vXML scripts of the vAPP. During the course of executing the vXML scripts, associated media and/or files may also be retrieved from various sites as part of the vAPP suite.

In the preferred embodiment, in order to increase performance, the vXML scripts, media and files that are retrieved into the vAGC are cached by the cache server 310. They are requested by the AGS through the cache server 310. If a cached copy of the requested data exists in the cache server, it is delivered directly to the AGS. If not, the cache server retrieves the data, caches it and delivers the data to the AGS to fulfill the request.

In the preferred embodiment, in order to simplify the design of the AGS and to improve the performance and scalability of it, the AGS is designed to handle only one native media format. For example, one suitable format for audio is G.711 or GSM. Media that come in different format are handed over to the media conversion proxy server 320, which coverts the media to the native format of the AGS 200.

Figure 7:
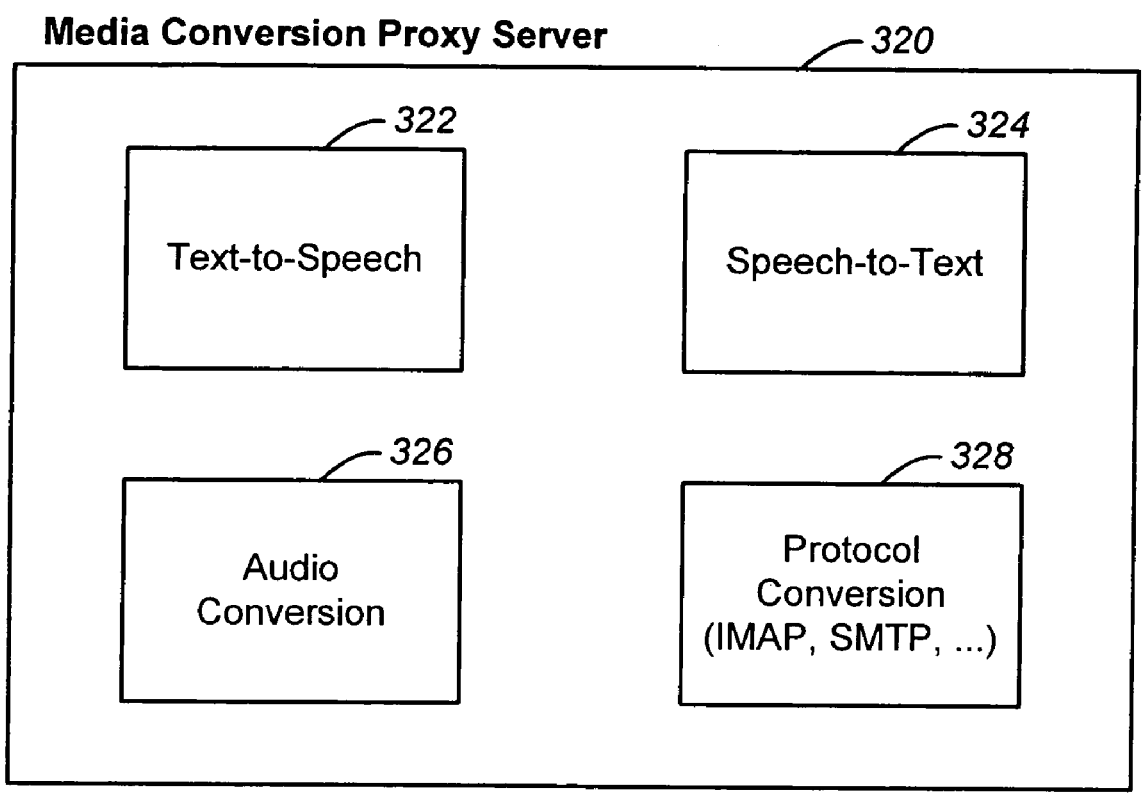
FIG. 7 is a block diagram illustrating schematically the components of the media conversion proxy server.

FIG. 7 is a block diagram illustrating schematically the components of the media conversion proxy server. The media conversion proxy server comprises a text-to-speech module 322, a speech-to-text module 324, an audio conversion module 326 and a protocol conversion module 328. The modular design allows for other "plug-ins" as the need arises. The text-to-speech module 322 is used for converting text to synthesized speech. For example, this is useful for reading back e-mail messages. The speech-to-text module 324 is used for converting speech to text. This is useful in speech recognition applications involving responding to a user's voice response.

The audio conversion module 326 converts between a supported set of audio formats, Such as G.711, G.723, CD audio, MP3, etc. The protocol conversion module 328 allows conversions between protocols such as IMAP (Internet Message Access Protocol) and SMTP (Simple Mail Transfer Protocol).

Application Gateway Server

Figure 8:
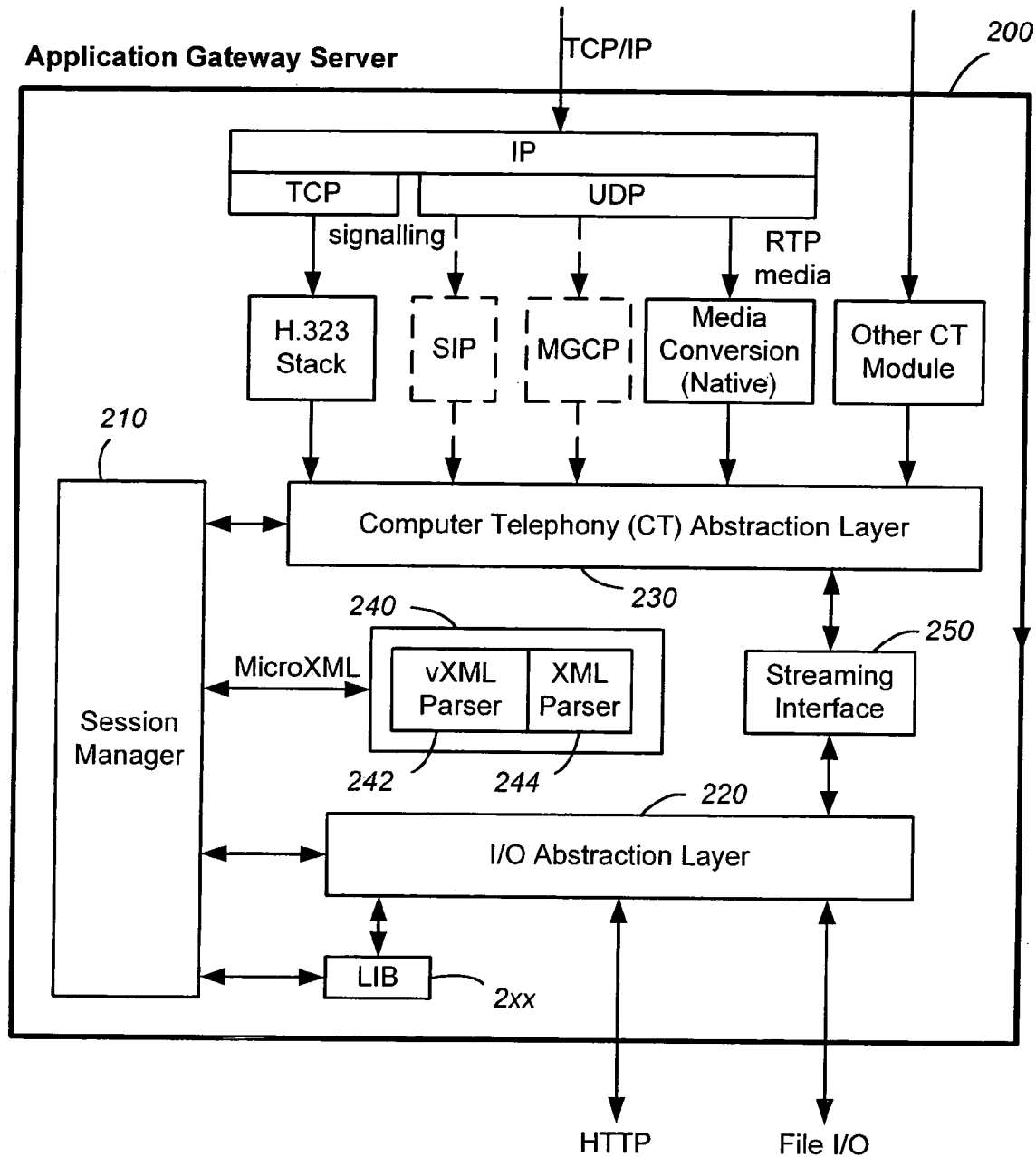
FIG. 8 is a detailed block diagram of the Application Gateway Server, which is the main component of the Application Gateway Center.

FIG. 8 is a detailed block diagram of the Application Gateway Server, which is the main component of the Application Gateway Center. The Application Gateway Server (AGS) 200 is responsible for accepting incoming calls, retrieving the vAPP associated with the dialed number and executing the vXML scripts of the vAPP. Each incoming call is treated as a separate session and the AGS is responsible for processing all user events and system actions that occur in multiple simultaneous sessions. The AGS is also responsible for all call routing in all sessions.

In the preferred embodiment, the AGS 200 is a set of software modules running on a Windows NT or Unix server. For example, the AGS is implemented as a Windows NT machine on a card, and multiple cards are installed on a caged backplane to form a highly scalable system.

The AGS 200 comprises four main software modules: a session manager 210; an I/O abstraction layer 220; a computer telephony (CT) abstraction layer 230; and a telephony scripting language parser 240. The telephony scripting language parser 240 further comprises a telephony XML or vXML parser 242 and a generic XML parser 244. In addition, a streaming interface 250 provides a direct streaming path for media data between the I/O abstraction layer 220 and the CT abstraction layer. Each of these modules is designed to be a separate DLL (Dynamically Linked Library) and perform a specific task. In the preferred embodiment, the AGS is a console only application with no user interface for any of these modules. Several of these modules incorporate commercial, third party software components in performing their tasks. These components will be discussed along with the appropriate modules.

The session manager 210 is the centerpiece of the AGS 200. It is responsible for creating new sessions, deleting terminated sessions, routing all actions and events to the appropriate modules and maintaining modularity between each session. It responds to I/O and vXML goto requests, and other additional events. In one embodiment, it employs commercially available software libraries containing thread and string classes from PWLib, a product of Equivalence Pty Ltd, Erina, New South Wales, Australia.

The session manager interfaces to the external of the AGS via the I/O abstraction layer 220 and the CT abstraction layer 230. It accesses the I/O and CT layers as a set of classes and member functions that are individual DLLs. The Session Manager 210 runs as a single-threaded processor of actions and event.

FIG. 8 also illustrates the manner in which the modules of the AGS must communicate with each other. The session manager communicates to both the I/O abstraction layer and the CT abstraction layer through traditional DLL entry points with C/C++ parameter passing. The I/O abstraction layer and the CT abstraction layer communicate through a streaming interface. The session manager and the telephony scripting language parser communicate through DLL entry points using microXML. The session manager 210 behaves like a virtual machine with its own set of "OpCodes". MicroXML is the parsed vXML scripts interpreted into these OpCodes, and will be described in more detail later.

A session begins with the reception of an asynchronous event from the CT abstraction module 230 signaling an incoming call. The Session Manager then creates a session for this call by accessing a database (e.g. DIR1 of FIG. 4A) keyed on the session's DNS and ANI information, which returns an initial vXML script. The telephony scripting language parser 240 is a separate DLL invoked through short microXML event scripts. It returns a microXML action script. A cycle of actions and events begins with the transmission of this script to the telephony scripting language parser 240 for processing. The telephony scripting language parser 240 responds to this event by returning a simple vXML script of its own containing I/O and CT action requests collected from the parsing of the script. The Session Manager now processes these action requests and then returns to parsing until the end of the session.

Each session is assigned a unique session identification, SID (session ID). For example, in the Microsoft Win32 platform, the SID is conveniently implemented by the creation of 128 bit globally unique Ids (GUIDs.

In the preferred embodiment, the session manager 210 is accessed or invoked via a number of interface points of its DLL as described in TABLE 1.

TABLE 1

| Session Manager's Interface Points | |
|---|---|
| SESSION MANAGER Interface Points | DESCRIPTION |
| VXESessionManager( ) | VXESessionManager constructor function. It creates and starts up an instance of an AGS Session Manager. |
| ~VXESessionManager( ) | VXESessionManager destructor function. It shuts down and deletes an instance of an AGS Session Manager. |
| AddEvent(VXEEvent&) | Member function to submit an event to a Session Manager's event queue. It receives a record of the incoming event and outputs TRUE if submission is successful, FALSE, otherwise. |
| GetSessions( ) | Provides a count of active sessions. |

The I/O abstraction layer 220 performs all input and output operations for the AGS 200. Essentially, it renders transparent to the internal of the AGS the variety of I/O formats and protocols that might be encounter externally. To the session manager 210, most HTTP, FTP, File, and memory-mapped I/O requests are reduced to four commands: open, close, read, and write. This allows access to a stream from any of these sources with the same procedure calls once the stream is open. In one embodiment, it incorporates available commercial software libraries, such as WinInet from Microsoft Corporation, Seattle; Wash., U.S.A and PWLib from Equivalence Pty Ltd. WinInet is a windows-specific DLL that allows the I/O abstraction layer to communicate to outside sources using HTTP and FTP. PWLib also used by the session manager 210 contains strings and threads classes.

In the preferred embodiment, the I/O abstraction layer 220 is accessed or invoked via a number of interface points of its DLL as described in TABLE 2. A single thread per active stream is created by instantiating a VXEIOStream when accessed by the session manager 210. If the stream is FTP or HTTP-based, then the user will need to provide the appropriate login data, submission method, and CGI variables. Next, the user calls the Open method and then uses the Read and Write methods to operate upon the stream until closing it with the Close method. At this point, this instance of the VXEIOStream is available for use on another stream source or it can be deleted.

The CT abstraction layer 230 will preferably make use of PWLib's platform-independent thread class. The CT Abstraction layer is instantiated by the Session Manager 210. It then seeks out a vXML configuration file that contains information on the number and type of telephony boards in its system. The member functions represent generic functionality that should be supportable across a wide variety of tele-

TABLE 2

I/O Abstraction Layer's Interface Points

| I/O ABSTRACTION LAYER Interface Points | DESCRIPTION |
| --- | --- |
| VXEIOStream( ) | VXEIOStream constructor function. It creates a new instance of a VXEIOStream. |
| ~VXEIOStream( ) | VXEIOStream destructor function. It shuts down stream and releases associated memory |
| open/openAsynchronous(char* name, StreamType streamtype, OpenMode mode) | Member function to open an I/O stream either synchronously or asynchronously. It has inputs: pathname, type of stream (HTTP, FTP, File, or Memory), and opening mode (Read/Write); and output: TRUE/FALSE for success/failure in synchronous mode, corresponding event asynchronously. |
| close( ) | Member function to close an open stream. It outputs: TRUE/FALSE for success/failure. |
| read/readAsynchronous(void* buffer, int count) | Member function to read from an open stream either synchronously or asynchronously. It has inputs: Pointer to buffer into which to write data, byte count to read from stream. It has outputs: Number of bytes read synchronously, corresponding event asynchronously |
| write/writeAsynchronous(void* buffer, int count) | Member function to write to an open stream either synchronously or asynchronously. It has inputs: Pointer to buffer from which to write data, byte count to write to stream. It has outputs: Number of bytes written synchronously, corresponding event asynchronously. |
| GetPos( ) | Member function to return position within a stream. |
| SetSubmitMethod(SubmitMethod method) | Member function to set CGI submission method for an HTTP stream before opening it. It has inputs: Submission method, either GET or PUT. |
| AddCGIVariable (VXEVariable& v) | Member function to add a CGI variable for submission to an HTTP stream before opening it. It has inputs: Variable name/value pair contained in a VXEVariable class. It has outputs: TRUE/FALSE for success/failure. |
| SetFTPLogin(PString& name, Pstring& passwd) | Member function to set FTP login information for an FTP stream before opening it. It has inputs: FTP user name and password. |

The computer telephony (CT) abstraction layer 230 is a thin abstraction layer that makes it possible for the AGS 200 to communicate with several computer telephony devices and/or protocols. In one direction, the CT abstraction layer receives requests for computer telephony actions from the session manager 210 and translates those requests to a CT module. In the other direction the CT abstraction layer receives user events directed to that CT module and relates them back to the session manager. In the preferred embodiment, the CT modules include a H.232 stack for handling VoIP signals, a SIP (Session Interface Protocol), a MGCP (Media Gateway Control Protocol) as well as other CT modules such as Dialogic CT modules. Since several CT modules can be placed below the CT abstraction layer and the CT abstraction will talk to all of the CT modules, the modular design allows the AGS to communicate with a new computer telephony device or protocol simply with the addition of a new CT module.

phony hardware. The motivation for this abstraction layer is to make the AGS 200 both platform and protocol independent.

In the preferred embodiment, the Session Manager 210, XML Parser 240, and CT Abstraction layer 230 cooperate via the following protocol. First, the telephony scripting language parser 240 locates a vXML element which requires a telephony task. Next, the telephony scripting language parser sends this task to the Session Manager in a microXML action string. The Session Manager then parses the microXML action string and determines the appropriate call to the CT abstraction layer along with its associated parameters. The Session Manager now calls the CT abstraction layer asynchronously and the CT abstraction layer returns an event signaling the completion of the CT task and the Session Manager resumes parsing.

In the preferred embodiment, the CT abstraction layer 230 is accessed or invoked via a number of interface points of its DLL as described in TABLE 3.

TABLE 3

CT Abstraction Layer's Interface Points

| CT ABSTRACTION LAYER Interface Points | DESCRIPTION |
| --- | --- |
| VXECTAbstraction(VXESessionManager*) | VXECTAbstraction constructor function. It has input: Associated Session Manager. It creates a new instance of a CT Abstraction. |
| ~VXECTAbstraction( ) | VXECTAbstraction destructor function. It shuts down an instance of a Voxeo CT Abstraction and releases associated memory |
| GetVersion(PString& version) | Member function to determine version. It has inputs: Reference to a string into which to copy version information. It has outputs: Version information copied into parameter 1 string |
| GetProtocol(PString& protocol) | Member function to determine active telephony protocol. It has inputs: Reference to a string into which to copy protocol information. It has outputs: Protocol information copied into parameter 1 string. |
| Answer(VXESession* pSession) | Member function to answer an incoming call. It has inputs: Session associated with incoming call. It has outputs: Asynchronous event indicating success/failure sent to Session Manager. |
| Hangup(VXESession* pSession) | Member function to hang up on an active call. It has inputs: Session associated with active call. It has outputs: Asynchronous event indicating success/failure sent to Session Manager. |
| call(VXESession* pSession, VXECall*) | Member function to make an outgoing call. It has inputs: Associated session, number to call. It has outputs: Asynchronous event indicating success/failure sent to Session Manager. |
| dial(VXESession* pSession, Pstring* number) | Member function to dial a string of digits. It has inputs: Associated session, digits to dial. It has outputs: Asynchronous event indicating success/failure sent to Session Manager. |
| Wink(VXESession* pSession) | Member function to perform wink function. It has inputs: Associated session. It has outputs: Asynchronous event indicating success/failure sent to Session Manager to an HTTP stream before opening it. |
| Void conference(VXESession* pSession1, VXESession* pSession2) | Member function to conference two active sessions/calls. It has inputs: Two sessions to conference together. It has outputs: Asynchronous event indicating success/failure sent to Session Manager. |
| Void flushDigitBuffer(VXESession* pSession) | Member function to flush digit buffer. It has inputs: Associated session. It has outputs: Asynchronous event indicating success/failure sent to Session Manager. |
| Void getDigits(VXESession* pSession, int maxdigits, Pstring& termdigits, Pstring& outdigits) | Member function to read digits from digit buffer. It has inputs: Associated session, maximum digits to read, termination digits string, string for digits read. It has outputs: Asynchronous event indicating success/failure and digits read sent to Session Manager. |
| PlayStream(VXESession* pSession, VXEIOStream&, const Pstring& termdigits) | Member function to play audio from an open stream. It has inputs: Associated session, audio stream, and termination digits. It has outputs: Asynchronous event indicating completion/termination sent to Session Manager. |
| PlayDate(VXESession* pSession, const PString& date, const PString& termdigits) | Member function to play current date. It has inputs: Associated session, string containing desired date, termination digits string. It has outputs: Asynchronous event indicating completion/termination sent to Session Manager. |
| PlayTime(VXESession* pSession, const PString& time, const PString& termdigits) | Member function to play current time. It has inputs: Associated session, string containing desired time, termination digits string. It has outputs: Asynchronous event indicating completion/termination sent to Session Manager. |
| PlayMoney(VXESession* pSession, const float value, const PString& termdigits) | Member function to play a dollar value. It has inputs: Associated session, value to play, termination digits string. It has outputs: Asynchronous event indicating completion/termination sent to Session Manager. |

TABLE 3-continued

CT Abstraction Layer's Interface Points

| CT ABSTRACTION LAYER Interface Points | DESCRIPTION |
|---|---|
| PlayCharacters(VXESession* pSession, const PString& string, const Pstring& termdigits) | Member function to play a string of characters. It has inputs: Associated session, string of characters to play, termination digits. It has outputs: Asynchronous event indicating completion/termination sent to Session Manager. |
| PlayString(VXESession* pSession, const PString& string, const Pstring& termdigits) | Member function to pronounce a text message. It has inputs: Associated session, string to pronounce, termination digits. It has outputs: Asynchronous event indicating completion/termination sent to Session Manager. |
| PlayNumber(VXESession* pSession, const PString& number, const Pstring&termdigits) | Member function to play a number. It has inputs: Associated session, string containing number to pronounce, termination digits. It has outputs: Asynchronous event indicating completion/termination sent to Session Manager. |
| PlayOrdinal(VXESession* pSession, const PString& ordinal, const Pstring& termdigits) | Member function to play an ordinal (1st, 2nd, 2rd, etc.). It has inputs: Associated session, ordinal, termination digits. It has outputs: Asynchronous event indicating completion/termination sent to Session Manager. |
| RecordStream(VXESession* pSession, XEIOStream& stream) | Member function record to an open VXEIOStream. It has inputs: Associated session, target stream. It has outputs: Asynchronous event indicating success/failure sent to Session Manager. |
| SendFAX(VXESession* pSession, VXEIOStream& file) | Member function to send a FAX. It has inputs: Associated session, VXEIOStream containing data to FAX. It has outputs: Asynchronous event indicating success/failure sent to Session Manager. |
| ReceiveFAX(VXESession* pSession, VXEIOStream &file) | Member function to receive a FAX. It has inputs: Associated session, VXEIOStream to which to receive FAX. It has outputs: Asynchronous event indicating success/failure sent to Session Manager. |

The streaming interface 222 provides a direct streaming transfer between the I/O abstraction layer 226 and the CT abstraction layer 230 when media data, such as audio or other multimedia is involved. For example, the streaming interface facilitates the AGS to play audio from URL's and to record audio to URL's in a streaming manner. In the preferred embodiment, the interface is generic and passes the burden of buffer management to the CT module in use. This allows specific CT modules to buffer information as appropriate for the corresponding telephony hardware or protocol. The streaming interface is implemented through the readAsynchronous and writeAsynchronous interface points in the I/O abstraction layer.

The telephony scripting language parser 240 is responsible for parsing the vXML scripts handed to it by the session manger 210. It in turn informs the session manager of the described actions coded in the vXML scripts. The telephony scripting language parser is modular and can accommodate additional parsers such as that for voiceXML and parsers for other telephony scripting language that may arise. In the present preferred embodiment, it comprises the vXML parser 242 and the generic XML parser 244

The generic XML parser 244 parses the vXML scripts, which are essentially XML scripts with embedded custom telephony tags, and puts them in a format that the vXML parser 242 can expediently act on. In the preferred embodiment, the generic XML parser 244 conveniently employs CueXML components available from CueSoft, Inc, Brighton, Colo., U.S.A. These components enable parsing of vXML documents into an object model, DOM (Document Object Model) listing the parsed objects in a hierarchical tree structure. This allows the vXML parser 242, which in the preferred embodiment is a DLL written in Delphi 5.0, to "walk" through the tree of objects and interpret them into microXML codes that can be understood by the session manager 210.

The vXML parser 242 behaves as follows: when called it will examine the incoming microXML and determine if there is a buffer of new vXML to parse, if such a buffer exists then the parser uses the generic XML parser 244 to construct a new object model for this buffer, the session object model is set to that model and the session state is cleared. The vXML parser 242 begins parsing from the session state in the session object model (an empty state implies the beginning of a document). As the parse traverses the document model the state is updated and events are generated. If these events are internal to the processor they are handled (i.e. assigns update the session variables, blocks may cause looping to occur), if the events are not internal then they are buffered for return to the session manager. When an event needs to be reported to the session manager the event buffer is processed so that variables are replaced with their values, wildcards are properly expanded, etc. This negates the need for any other module to maintain information about session variables.

The vXML parser 242 is required to maintain state per session so that each invocation of the vXML parser will continue where the previous invocation within the same session ended. The maintenance of state includes preserving the DOM for the current instance of vXML, the node in the DOM that the parser is currently examining, and any variables that are associated with the session.

In the preferred embodiment, the vXML parser 242 is accessed or invoked via a number of interface points of its DLL as described in TABLE 4.

TABLE 4 vXML Parser Interface Points

| VXML PARSER Interface Points | DESCRIPTION |
|---|---|
| Create | Creates an instance of the vXML parser. It has output: integer result code (negative numbers denote errors). |
| Destroy | Destroys an instance of the vXML parser. It has output: integer result code (negative numbers denote errors). |
| Parse | Performs the main tasks of the vXML parser (i.e. determines actions from vXML, and maintains state. It inputs: microXML string containing the sessionID. The microXML may also contain a buffer of vXML (described above) and a pointer to instance data. It outputs: microXML string containing the action(s) generated by this invocation and possibly modification of the instance data. |
| Kill | It has input: pointer to instance data. It has output: integer result code (negative numbers denote errors). |

As mentioned earlier, microXML is a subset of simple vXML used for communication between the session manager 210 and the telephony scripting language parser 240. MicroXML is the native codes of the virtual machine of the session manager 210. In one direction, the vXML parser 242 communicates with the session manger 210 in a synchronous manner using microXML. In another other direction, user events may also be reported to the vXML parser via microXML. If a user event is reported the parser will find the appropriate event handler by first looking locally for a valid handler. If a handler is not found there then the parent node in the document model is examined for a valid handler. The search continues in this manner until either a handler is found or there is no parent to examine. If a handler is found then the parser sets the state to the handler and begins parsing as described above. If a handler is not found then an error is returned via microXML.

In the preferred embodiment, MicroXML is composed of a limited number of tags, these tags do not have any attributes, and CDATA sections are not supported. Table 5 shows examples of microXML tags:

TABLE 5 microXML Tags

| MicroXML TAG | NAME |
|---|---|
| ACT | Action |
| BUF | Buffer |
| DAT | Instance Data |
| ERR | Error |
| EVT | Event |
| ETP | Event Type |
| EVL | Event Value |
| LBL | Label |
| TYP | Type |
| P00 | Parameter0 |
| P00 | Parameter99 |
| SID | Session ID | vXML is XML with additional custom tags for telephony applications. TABLE 6A-6D lists example tags useful for creating telephony applications. A user or developer need only code his or her telephony application in these vXML tags and deploy the resulting scripts as a webpage on the Internet for the vAGS 200 to access.

TABLE 6A vXML General Tags

| vXML GENERAL TAG Examples | DESCRIPTION |
|---|---|
| <assign var="ttt" value="123"/> | Assigns value "123" to variable named "ttt. |
| <clear var="ttt"/> | Clears variable named "ttt". |
| <clearDigits /> | Clears the digit buffer. |
| <getDigits var="pager_msg" maxdigits="9" termdigits="#*" includetermdigit="TRUE\|FALSE" cleardigits="TRUE\|FALSE" maxtime="30s" ptime="5s"/> | This element reads input digits from the phone and places them into a variable defined within the element itself. In the example, the user would have 30 seconds to enter up to 9 digits on her phone, pausing no more than 5 seconds between digits, and ending the digit input with either the # key or * key. This element is designed for gathering PIN codes, Pager numbers, and anything else that involves multiple digits coming from the user. |
| <block label="here" repeat="?" cleardigits="TRUE\|FALSE"> Events Elements </block> | The block element is used to logically group other elements together, as well as providing a looping structure so that vXML elements can be repeated a specific number of times (e.g., a menu that plays an audio prompt four times before timing out.) |
| <goto value="http://w.v.n/next.voxeo#block" submit="all\|*\|x,y,z" method="put\|post"/> | This element will leap to another bank of vXML code, whether it be in the same file or another file. |
| <return/> | One example of Return is to implement <goto> calls as a call stack. <Return> would return from a <goto> call. |
| <run value="http://w.v.n/next.voxeo\|#block" submit="all\|*\|x,y,z" method="put\|post" | This runs/launchs a vXML script at a URL or URI in a new session, then continues to process this session |

TABLE 6A-continued vXML General Tags

| vXML GENERAL TAG Examples | DESCRIPTION |
|---|---|
| newSessionID="newID"/> <sendevent value="msg_call_answered" sessionID="sss"/> | This tag allows for one session to send a message to another session. |

TABLE 6B vXML CAll Control Tags

| vXML CALL CONTROL TAG Examples | DESCRIPTION |
|---|---|
| <answer/> | This answers the call. |
| <hangup/> | This informs the server to hangup the call. |

TABLE 6B-continued vXML CAll Control Tags

| vXML CALL CONTROL TAG Examples | DESCRIPTION |
|---|---|
| <call value="pstn:14079757500" maxtime="15s"/> | This element allows for outbound calls to be created from within a vXML script. |
| <conference sessions="sessionID1, sessionID2, sessionID3"/> | This element allows for multiple lines in separate sessions to be conferenced together. |

TABLE 6C vXML Media Tags

| vXML MEDIA TAG Examples | | DESCRIPTION |
|---|---|---|
| <play . . . /> | | <Playaudio> can be used to play an |
| <playnumber | format="say\|read" value="12345" termdigits="*#" cleardigits="TRUE\|FALSE"/> | audio file and wait for a terminating digit to be pressed. The element must be located within a larger <block> structure, which is used to control the |
| <playmoney | format="???" value="1.25" termdigits="*#" cleardigits="TRUE\|FALSE"/> | number of repetitions the audio is played before "timing out." Like the earlier example of <getDigits>, <playaudio> can be implemented |
| <playdate | format="ddmmyyhhss" value="1012990732" termdigits="*#" cleardigits="TRUE\|FALSE"/> | with event handlers to properly recognize that the <playaudio> command was halted because a terminating digit was pressed by the user. |
| <playchars | format="?" value="abcdefgh" termdigits="*#" cleardigits="TRUE\|FALSE"/> | |
| <playtone | format="?" value="2000hz+1000hz"\" termdigits="*#" cleardigits="TRUE\|FALSE"/> | |
| <playaudio sample.vox" | format="audio/msgsm" value="http://www.blahblah.com/ termdigits="*#" cleardigits="TRUE\|FALSE"/> | |
| <recordaudio | format="audio/msgsm" value="ftp://www.v.n/msg.wav" termdigits="*#" cleardigits="TRUE\|FALSE" maxtime="30s" ptime="5s"/> | Like its counterpart <playaudio>, this element must be contained within a viable <block> structure and utilize an event handler such that one generated by a user action to control it. Its intended use is to leave voicemail messages, record greetings, etc. In the example above, the user would be allowed to speak into the phone to record audio for up to 30 seconds (with no more than a 5 second pause anywhere within), and could end the recording segment by pressing either the * or # key. The new audio file would then be saved at |

TABLE 6C-continued vXML Media Tags

| vXML MEDIA TAG Examples | DESCRIPTION |
|---|---|
| | www.v.n/msg.wav in the audio/msgsm format. The clearDigits attribute, again, is used to ensure a "fresh" start during the audio recording, in case one of the terminating digits was pressed prior to initiating the recording. |
| <receivefax  format="audio/tiff-f"<br>       value="ftp://w.v.n/msg.tif"<br>       maxtime="5m"<br>       ptime="30s"<br>       maxpages="30"/> | Receives a fax. |
| <sendfax  format="audio/tiff-f"<br>       value="http://w.v.n/msg.tif"<br>       maxtime="5m"<br>       ptime="30s"<br>       maxpages="30"/> | Sends a fax. |
| <text  format="?"<br>      termdigits="#"<br>      cleardigits="TRUE\|FALSE"><br>Text to read<br></text> | This is used to tell the application gateway server to use a text-to-speech engine for reading the enclosed text to the caller. |
| <vcommand name="id"<br>value="url\|vocab-grammar-string"> | This is used to tell the application gateway server to use a speech-to-text engine for voice recognition. |

TABLE 6D vXML High Level Tags

| VXML HIGH LEVEL TAG Examples | DESCRIPTION |
|---|---|
| <menu  label="main_menu"<br>      repeat="3"<br>      format="audio/msgsm"<br>      value="http://w.v.n/msg.wav"<br>      cleardigits="TRUE\|FALSE"<br>      termdigits="567890*#"<br>      maxtime="15s" ><br>Events<br>    <onkey value="1"><br>    </onkey><br>    <onkey value="2"><br>    </onkey><br>    <onmaxtime value="1\|2\|max"><br>    </onmaxtime><br>  <onhangup><br>  </onhangup><br></menu> | Menu is an element that is descended from a <block> element and a <playAudio> element. In this embodiment, an <ontermdigit> event handler is used, to handle the event when a terminating digit has been pressed. It is designed to accept a single digit input and then check for a matching <onkey> event handler. This element is to allow easy-to-use menus, where one key press will move you through an application. In the example above (and below), the audio file will be played 3 times before "timing out" and moving on in the vXML code |
| <inputdigits  label="input_pin"<br>    repeat="3"<br>    var="pager_msg"<br>    format="audio/msgsm"<br>    value="http://w.v.n.msg.wav"<br>    termdigits="#*"<br>    cleardigits="TRUE\|FALSE"<br>    includetermdigit="TRUE\|FALSE"<br>    maxdigits="4"<br>    maxtime="15s"<br>    ptime="5s"><br>Events<br>    <oninputvalue value="123"><br>    </oninputvalue><br>    <oninputlength len="3"><br>    </oninputlength><br>    <ontermdigit value="#"><br>    </ontermdigit><br>    <onmaxdigits> | <InputDigits> is an element that is descended from a <block> element and a <getDigits> element. It combines the attributes of those two elements into a single element. Like the <menu> element above, <inputDigits> simplifies the process of making a function to gather digits from the user. It will play a message (contained in the "value" attribute) and store the gathered information in the "var" attribute. In the example, the user has 15 seconds to enter up to 4 digits (possibly for a PIN code), with a pause of no more than 5 seconds between keystrokes. Either the # or * key will end the input process, and the audio message/prompt will loop 3 times before dropping out of the element (i.e., timing out), and proceeding on to the rest of the vXML code. |

TABLE 6D-continued vXML High Level Tags

| VXML HIGH LEVEL TAG Examples | DESCRIPTION |
|---|---|
| `</onmaxdigits>`<br>`<onmaxtime value="1|2|max">`<br>`</onmaxtime>`<br>`<onptime>`<br>`</onptime>`<br>`<onhangup>`<br>`</onhangup>`<br>`</inputdigits>` | |

EXAMPLES

The following are examples of microXML communication between the session manager 210 and the vXML parser 242.

| MicroXML sent from the session manager to the vXML parser |
|---|
| Request the parsing of a new file<br>`<ACT>`<br>  `<SID>24601</SID>`<br>  `<BUF>`<br>    `<?xml version="1.0" encoding="UTF-8"?>`<br>    `<voxeoxml>`<br>    `<assign var="rootdir" value="http://www.voxeo.com/"/>`<br>    `<block label="1" repeat="3">`<br>    `<playaudio format="audio/default" value="$rootdir;greeting.vox"/>`<br>    `</block>`<br>    `</voxeoxml>`<br>  `</BUF>`<br>`</ACT>`<br>Request the continued parsing of the same file<br>`<ACT>`<br>  `<SID>24601</SID>`<br>`</ACT>`<br>Report a basic user event to the vXML parser<br>`<EVT>`<br>  `<SID>24601</SID>`<br>  `<ETP>termdigit</ETP>`<br>  `<EVL>#</EVL>`<br>`</EVT>`<br>Report a user event with parameter(s) to the vXML parser<br>`<EVT>`<br>  `<SID>24601</SID>`<br>  `<ETP>termdigit</ETP>`<br>  `<EVL>#</EVL>`<br>  `<P00>assign=varname=value</P00>`<br>`</EVT>` |

| MicroXML sent from the vXML parser to the session manager |
|---|
| Action from parser<br>`<ACT>`<br>`<TYP>playaudio</TYP>`<br>`<PR1>format=audio/default,value=http://www.voxeo.com/greeting.vox</PR1>`<br>`</ACT>` |

The following is an example of a vXML file:

| Example vXML file |
|---|
| `<?xml version="1.0" encoding="UTF-8"?>`<br>`<voxeoxml>`<br>  `<!-- This is a test file to exercise the voxeoXML parser -->`<br>  `<assign var="audiodir" value="http://www.voxeo.com/audio"/>`<br>  `<block label="testlooping" repeat ="3">`<br>  `<assign var="foo" value="$foo;bar"/>`<br>  `<playaudio`<br>    `format="audio/msgsm"`<br>    `value="$audiodir;/$foo;.vox"`<br>    `termdigits="*"`<br>    `cleardigits="true"`<br>  `/>`<br>  `</block>`<br>  `<hangup/>`<br>`</voxeoxml>` |

The example vXML file results in the following corresponding microXML being generated by the vXML parser and sent to the session manager:

| The resulting microXML |
|---|
| Separate calls to parse are delimited by '---------------------------'<br>---------------------------<br>`<ACT>`<br>  `<SID>24601</SID>`<br>  `<TYP>cleardigits</TYP>`<br>`</ACT>`<br>`<ACT>`<br>  `<SID>24601</SID>`<br>  `<TYP>playaudio</TYP>`<br>  `<PR1>format=audio/msgsm,value=http://www.voxeo.com/audio/bar.vox,termdigits=*</PR1>`<br>`</ACT>`<br>---------------------------<br>`<ACT>`<br>  `<SID>24601</SID>`<br>  `<TYP>cleardigits</TYP>`<br>`</ACT>`<br>`<ACT>`<br>  `<SID>24601</SID>`<br>  `<TYP>playaudio</TYP>`<br>  `<PR1>format=audio/msgsm,value=http://www.voxeo.com/audio/barbar.vox,termdigits=*</PR1>`<br>`</ACT>`<br>---------------------------<br>`<ACT>`<br>  `<SID>24601</SID>`<br>  `<TYP>cleardigits</TYP>`<br>`</ACT>` |

| The resulting microXML |
|---|
| ```
<ACT>
  <SID>24601</SID>
  <TYP>playaudio</TYP>
  <PR1>format=audio/msgsm,value=http://www.voxeo.com/audio/
barbarbar.vox,termdigits
=*</PR1>
</ACT>
----------------------------
<ACT>
  <SID>24601</SID>
  <TYP>hangup</TYP>
  <PR1></PR1>
</ACT>
----------------------------
<ACT>
  <SID>24601</SID>
  <TYP>EOF</TYP>
  <PR1></PR1>
</ACT>
``` |

Figure 9:
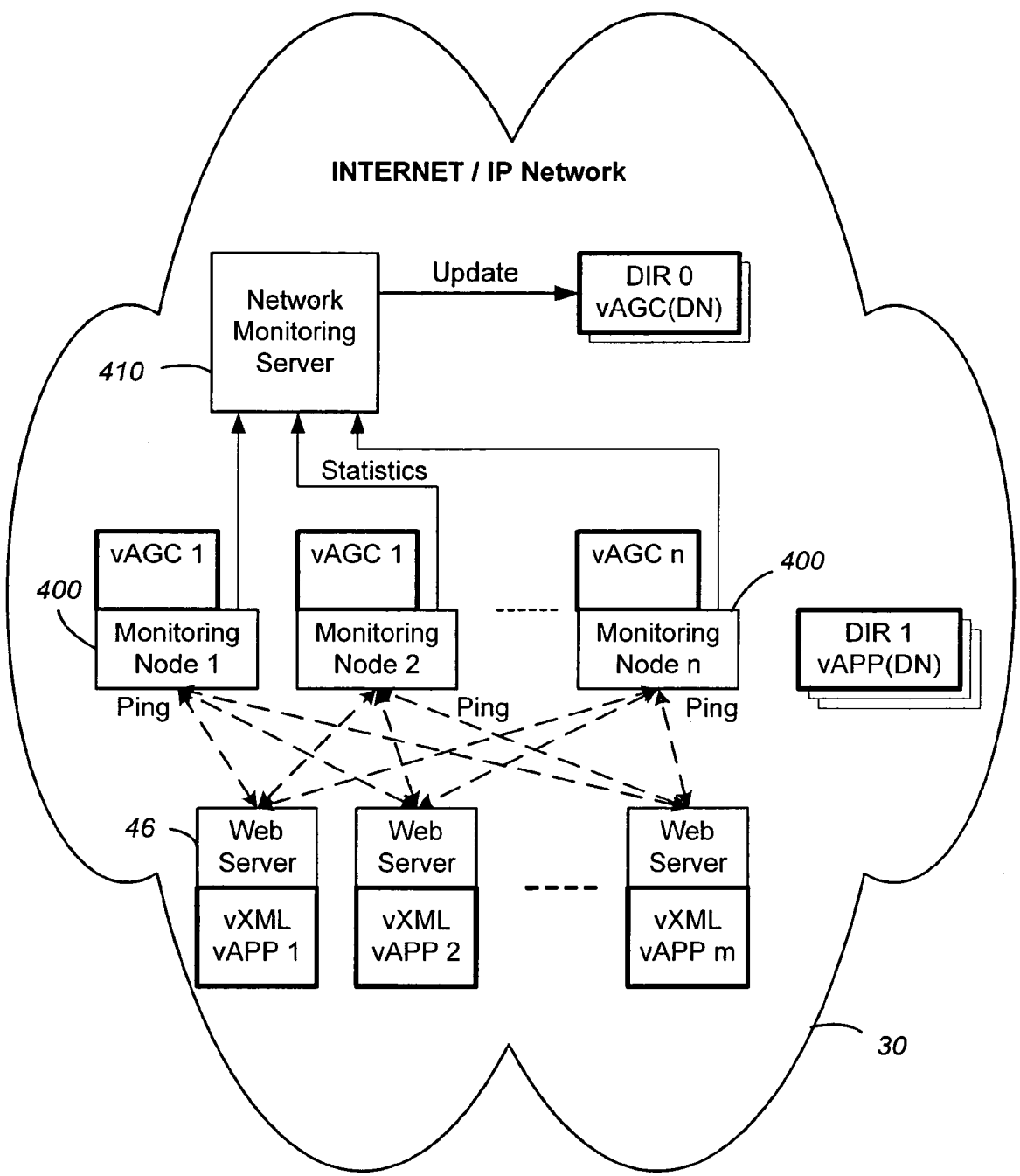
FIG. 9 is a system block diagram of a network traffic monitoring system operating in cooperation with the Distributed Application Telephony Network System of the present invention.

FIG. 9 is a system block diagram of a network traffic monitoring system operating in cooperation with the Distributed Application Telephony Network System of the present invention. The invention contemplates a larger number of enterprises and users will deploy telephony applications on the Internet 30 in the form of vXML applications such as vAPP 1, vAPP 2, ..., vAPP m. These applications are served by a number of web servers 46 on the Internet. When a call associated with one of the these vAPP enters the Internet, it must be directed to one of a plurality of application gateway centers, such as vAGC 1, vAGC 2, ..., vAGC n. In the preferred embodiment, in order to provide the best quality-of-service, the call is preferably directed to a vAGC having the best access to the associated vAPP. The invention includes providing monitoring of the accessibility of the individual vAPPs relative to the plurality of vAGCs. This will enable the call to be directed to the vAGC having the best access to that associated vAPP.

Each vAGC site is provided with a traffic monitor 400 that periodically pings the plurality of vAPP sites and detects the return signals. The response time of each vAPP site to any given vAGC is collected by a network monitoring server 410. Since each vAPP is associated with a call or dialed number (DN), the network monitoring server computes a listing of DNs versus vAGCs sorted in order of fastest response time. This information is used to update the DIR0 directory (see FIG. 4A) dynamically. In this way, when a call to a given DN is to be directed to an AGC, a DIR0 lookup will point to the vAGC with the faster access to the vAPP site associated with the given DN.

While the embodiments of this invention that have been described are the preferred implementations, those skilled in the art will understand that variations thereof may also be possible. Therefore, the invention is entitled to protection within the full scope of the appended claims.

What is claimed is:

1. A method of processing a telephone call to a call number in a networked computer telephony system, comprising:

providing a plurality of Extensible Markup Language (XML) documents hosted by a web server among a plurality of web servers on the Internet, each of said XML documents constituting a telephony application associated with a specified call number and including telephony-specific XML scripts with tags instructing how a telephone call to the specified call number is to be processed;

providing a plurality of application gateway centers, each capable of processing the telephone call by retrieving and processing the XML document associated with the call number of the telephone call;

periodically pinging from each of the plurality of application gateway centers to the plurality of web servers to measure a response time from each web servers; and directing the telephone call to be processed by the application gateway center having a fastest response time from the web server hosting the XML document associated with the call number.

2. A method as in claim 1, further comprising:

providing a directory of application gateway centers in order of faster response time for the web server hosting the XML document associated with the call number of the telephone call; and wherein said directing the telephone call further includes:

looking up the directory with the telephone call number for the application gateway center having the fastest response time.

3. A method as in claim 2, further comprising:

providing a monitoring server for collecting the response time of each web server to any one of the plurality of application gateway centers;

dynamically updating the directory with a listing of call numbers versus application gateway centers, the application gateway centers associated with each call number being in order of descending response time.

4. A networked computer telephony system for processing a telephone call to a call number, comprising:

a plurality of Extensible Markup Language (XML) documents hosted by a web server among a plurality of web servers on the Internet, each of said XML documents constituting a telephony application associated with a specified call number and including telephony-specific XML scripts with tags instructing how a telephone call to the specified call number is to be processed;

a plurality of application gateway centers, each capable of processing the telephone call by retrieving and processing the XML document associated with the call number of the telephone call;

a plurality of network traffic monitors, each associated with an individual application gateway center for periodically pinging the plurality of web servers to measure a response time from each web servers to each application gateway center; and a directory for directing the telephone call to be processed by a application gateway center, said directory being dynamically updated with a list of application gateway centers in order of fastest response time for the web server hosting the XML document associated with the call number.

5. A networked computer telephony system for processing a telephone call to a call number, comprising:

a plurality of Extensible Markup Language (XML) documents hosted by a web server among a plurality of web servers on the Internet, each of said XML documents constituting a telephony application associated with a specified call number and including telephony-specific XML scripts with tags instructing how a telephone call to the specified call number is to be processed;

a plurality of application gateway centers, each capable of processing the telephone call by retrieving and processing the XML document associated with the call number of the telephone call;

a plurality of network traffic monitors, each associated with an individual application gateway center for periodically pinging the plurality of web servers to measure a response time from each web servers to each application gateway center;

a directory for directing the telephone call to be processed by a application gateway center, and means for dynamically updating said directory with a list of application gateway centers in order of fastest response time for the web server hosting the XML document associated with the call number.

* * * * *